United States Patent
Fung et al.

(10) Patent No.: US 8,196,109 B2
(45) Date of Patent: Jun. 5, 2012

(54) COMMON DEBUG ADAPTOR IN A MULTIPLE COMPUTER PROGRAMMING LANGUAGE ENVIRONMENT

(75) Inventors: Jane Chi-Yan Fung, Thornhill (CA); Grace Hai Yan Lo, Thornhill (CA); William Gerald O'Farrell, Markham (CA); Shu Xia Tan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 12/065,914

(22) PCT Filed: Sep. 9, 2005

(86) PCT No.: PCT/CA2005/001380
§ 371 (c)(1),
(2), (4) Date: Mar. 6, 2008

(87) PCT Pub. No.: WO2007/028227
PCT Pub. Date: Mar. 15, 2007

(65) Prior Publication Data
US 2008/0263522 A1    Oct. 23, 2008

(51) Int. Cl.
*G06F 9/44* (2006.01)
*G06F 9/45* (2006.01)

(52) U.S. Cl. ............... 717/125; 717/126; 717/149

(58) Field of Classification Search .......... 717/124–129, 717/148–150
See application file for complete search history.

(56) References Cited

U.S. PATENT DOCUMENTS

| | | | |
|---|---|---|---|
| 5,151,991 A * | 9/1992 | Iwasawa et al. | 717/150 |
| 5,953,530 A | 9/1999 | Rishi et al. | |
| 6,016,474 A * | 1/2000 | Kim et al. | 717/125 |
| 6,042,614 A * | 3/2000 | Davidson et al. | 717/116 |
| 6,158,045 A * | 12/2000 | You | 717/124 |
| 6,282,701 B1 * | 8/2001 | Wygodny et al. | 717/125 |
| 6,349,406 B1 * | 2/2002 | Levine et al. | 717/128 |
| 6,353,923 B1 | 3/2002 | Bogle et al. | |

(Continued)

FOREIGN PATENT DOCUMENTS

EP    1220099 A3    3/2002

(Continued)

OTHER PUBLICATIONS

Lee to al, "Replay debugging for multi threaded embedded software", IEEE, pp. 15-22, 2010.*

(Continued)

*Primary Examiner* — Anil Khatri
(74) *Attorney, Agent, or Firm* — Lee Law, PLLC; Christopher B. Lee

(57) ABSTRACT

Software developers working on multi-language systems with various debug tools (BPEL, AE, Java, etc.) can use a common debug adaptor (CDA). The CDA implements a method of debugging in a multi-computer program language environment. The method includes registering various debug tools associated with different programming languages in the multi-computer program language environment, each one of the plurality of debug tools providing suspended threads and stack frames in response to a debug event in the multi-computer program language environment. The method can further include receiving the suspended threads and stack frames from the plurality of debug tools. The method can further include correlating the received suspended threads and stack frames under a common suspended thread; and providing the common suspended thread in a debug view. Such a method can have a number of attributes intended to assist developers facing debugging problems in multi-language systems.

16 Claims, 6 Drawing Sheets

U.S. PATENT DOCUMENTS

| | | | |
|---|---|---|---|
| 6,480,818 B1 | 11/2002 | Alverson et al. | |
| 6,507,805 B1 * | 1/2003 | Gordon et al. | 702/186 |
| 6,601,189 B1 * | 7/2003 | Edwards et al. | 714/30 |
| 6,651,243 B1 * | 11/2003 | Berry et al. | 717/130 |
| 6,658,652 B1 * | 12/2003 | Alexander et al. | 717/128 |
| 6,721,941 B1 | 4/2004 | Morshed et al. | |
| 6,728,949 B1 * | 4/2004 | Bryant et al. | 717/127 |
| 6,754,890 B1 * | 6/2004 | Berry et al. | 717/128 |
| 7,203,926 B2 * | 4/2007 | Bogle et al. | 717/124 |
| 7,299,454 B2 * | 11/2007 | Pugh et al. | 717/125 |
| 7,340,731 B2 * | 3/2008 | Laura | 717/149 |
| 7,383,540 B2 * | 6/2008 | Kalra | 717/129 |
| 7,500,226 B2 * | 3/2009 | Tillmann et al. | 717/126 |
| 7,823,131 B2 * | 10/2010 | Gard et al. | 717/125 |
| 7,992,133 B1 * | 8/2011 | Theroux et al. | 717/124 |
| 8,032,872 B2 * | 10/2011 | Violleau et al. | 717/149 |

FOREIGN PATENT DOCUMENTS

WO     WO 01/69390 A2     9/2001

OTHER PUBLICATIONS

Wu et al, "Weaving a debugging aspect into domain specific language grammars", ACM SAC, pp. 1370-1374, 2005.*

Apter et al, "Towards debugging programs written in multiple domain specific aspect languages", ACM DSAL, pp. 5-8, 2011.*

Ashok et al, "DebugAdvisor: A recommender system for debugging", ACM ESEC-FSE, pp. 373-382, 2009.*

* cited by examiner

COMMON DEBUG ADAPTOR IN A MULTIPLE COMPUTER PROGRAMMING LANGUAGE ENVIRONMENT

FIELD OF THE INVENTION

The present invention relates to the debugging of software and various software components and more particularly to managing various debugging tools in integrated development environments.

BACKGROUND

A debugger (or debugging tool) is a computer program that is used to debug (and in some cases test or optimize) other computer programs. When the computer program crashes, the debugger generally shows the offending position or location in the original code (for source-level debuggers). A crash occurs when the computer program cannot continue because of a programming bug. Typically, debuggers offer functions such as running a program step by step (single stepping), stopping (breaking) at a particular event and tracking the values of variables.

Many software systems (multi-threaded or distributed systems) are written in more than one programming language. For example, a system may be implemented in Java with another language running on top of Java that needs to be debugged. Further difficulties are presented due to the lack of standardization in terms of internal structures, such as stack frames, between different programming languages.

For example, in business integration tooling, there are often different language debugger tools running on different debug runtime/test environments. In the tooling, each debugger would have its own way to show its suspended thread and stack frame. Each debugger may not know the existence of the other one. These situations create significant difficulties for software developers attempting to debug these systems.

Consequently, there exists an ongoing need for debugging technology that facilitates efficient programming by way of language, debug tool, host application and operating environment independence.

SUMMARY

Methods and systems for use in a debugging environment that can be used by software developers working on multi-computer program language environments are described. The techniques used create a common debug adaptor that manages various debug tools (each associated with a different computer language) to provide merged information from debug events to enable debugging between multi-languages in a multi-language environment.

Certain exemplary embodiments can provide a method of debugging in a multi-computer program language environment, the method comprising: registering a plurality of debug tools associated with different programming languages in the multi-computer program language environment, each one of the plurality of debug tools providing suspended threads and stack frames in response to a debug event in the multi-computer program language environment; receiving the suspended threads and stack frames from the plurality of debug tools; correlating the received suspended threads and stack frames under a common suspended thread; and providing the common suspended thread in a debug view.

Certain exemplary embodiments can provide a system for debugging in a multi-computer program language environment, the system comprising: a registry module for registering a plurality of debug tools associated with different programming languages in the multi-computer program language environment, each one of the plurality of debug tools providing suspended threads and stack frames in response to a debug event in the multi-computer program language environment; a correlation module for receiving the suspended threads and stack frames from the plurality of debug tools and correlating the received suspended threads and stack frames under a common suspended thread; and a user interface module for providing the common suspended thread in a debug view.

Certain exemplary embodiments can provide a computer program product for debugging in a multi-computer program language environment, the product comprising: a registry mechanism that is executable on the computer program for registering a plurality of debug tools associated with different programming languages in the multi-computer program language environment, each one of the plurality of debug tools providing suspended threads and stack frames in response to a debug event in the multi-computer program language environment; a correlation mechanism that is executable on the computer program for receiving the suspended threads and stack frames from the plurality of debug tools and correlating the received suspended threads and stack frames under a common suspended thread; and a user interface mechanism that is executable on the computer program for providing the common suspended thread.

Certain exemplary embodiments can provide an apparatus for debugging in a multi-computer program language environment, the apparatus comprising: a processor; a memory coupled to the processor; a computer program residing in the memory; a common debug adaptor residing in the memory and executed by the processor; the common debug adaptor comprising: a registry module for registering a plurality of debug tools associated with different programming languages in the multi-computer program language environment, each one of the plurality of debug tools providing suspended threads and stack frames in response to a debug event in the multi-computer program language environment; a correlation module for receiving the suspended threads and stack frames from the plurality of debug tools and correlating the received suspended threads and stack frames under a common suspended thread; and a user interface module for providing the common suspended thread.

DETAILED DESCRIPTION

Figure 1:
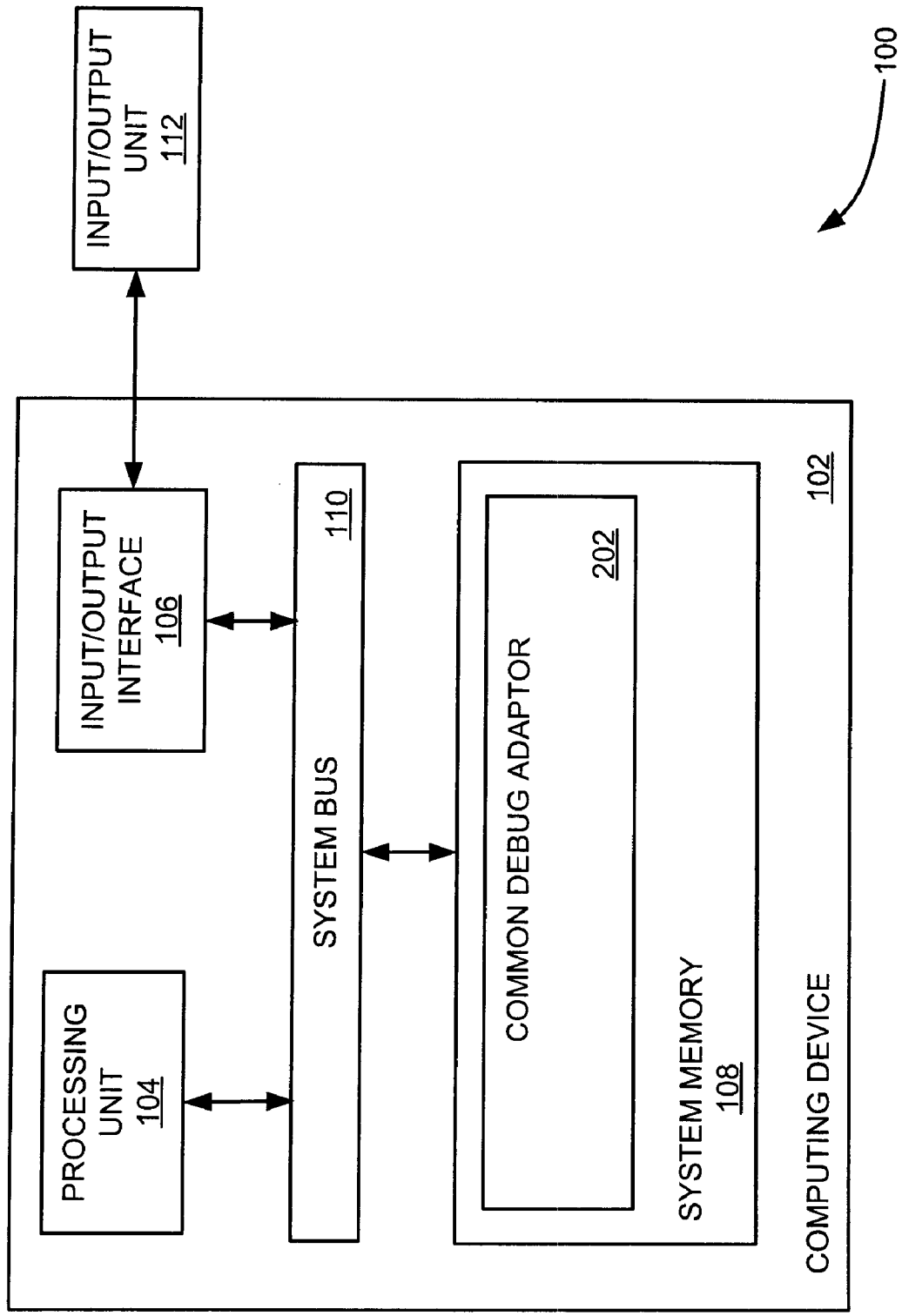
FIG. 1 illustrates an example of a computing system environment in block diagram form used to implement common debug adaptor technology according to various embodiments of the present invention.

Computing System Environment—FIG. 1

FIG. 1 illustrates an example of a computing system environment 100 in which embodiments of the present invention can be implemented. The computing system environment 100 is only one example of a suitable computing environment and is not intended to suggest any limitation as to the scope of use or functionality of the various embodiments described. Examples of other computing system environments or configurations that may be suitable include: a general purpose Personal Computer (PC); a hand-held or lap top computer; multi-processor based systems; microprocessor based systems; programmable consumer electronics; network computers, minicomputers, mainframe computers and distributed computing environments.

The computing system environment 100 includes a general purpose computing device 102. Components of the computing device 102 include, but are not limited to, a processing unit 104, an input/output interface 106, a system memory 108, and a system bus 110. The system bus 110 communicatively connects the aforementioned components and numerous other (not shown) cooperatively interactive components. The input/output interface 106 interacts with external components through an input/output unit 112 (which can include keyboard, mouse-type controllers, monitors, media readers/writers and the like). The system memory 108 instantiates various components and operations of a common debug adaptor 202 according to embodiments of the present invention described in detail in subsequent figures. The computing system environment 100 serves as an apparatus for performing common debug adaptor processes.

Figure 2A:
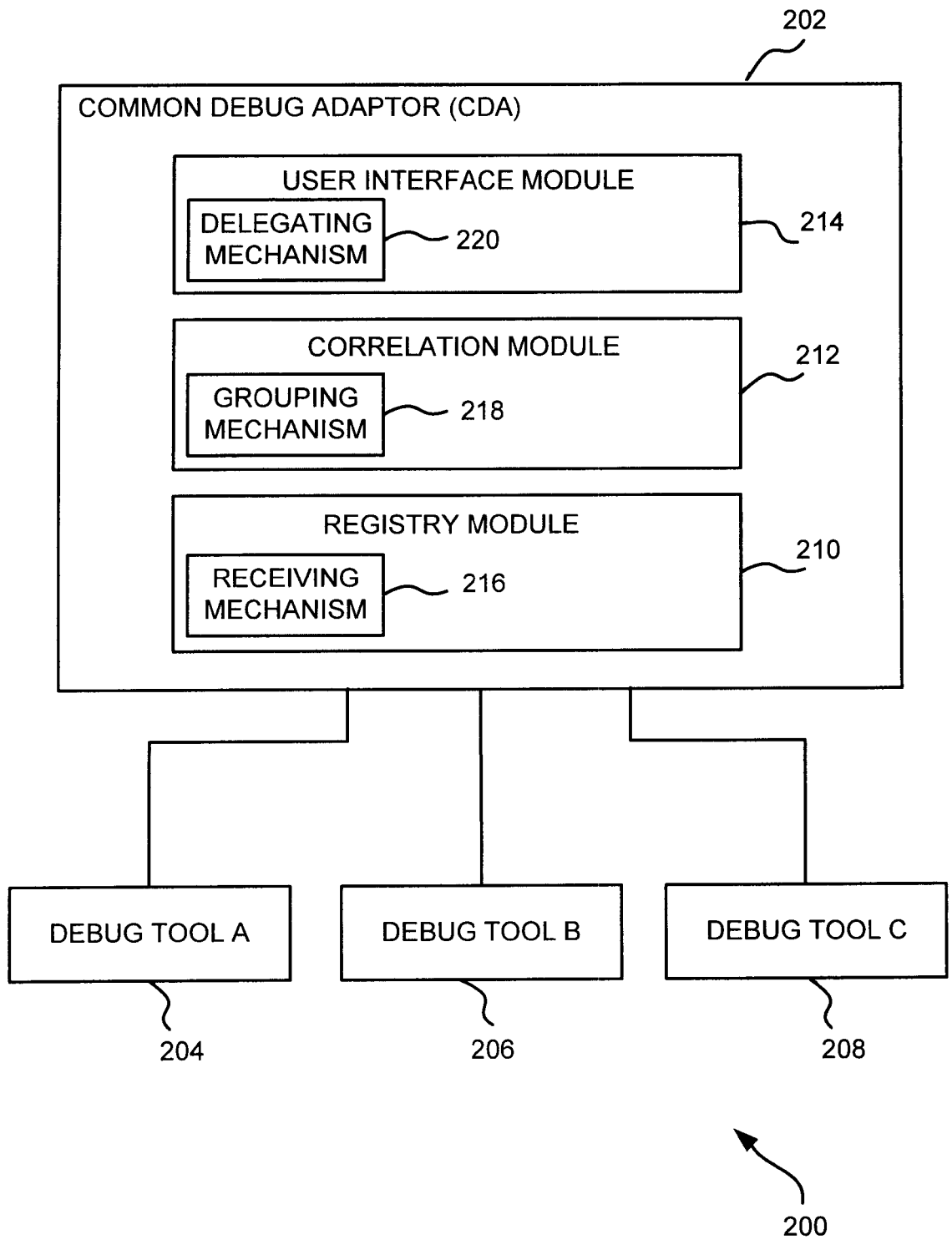
FIG. 2A illustrates an example of a common debug adaptor environment in block diagram form.
Figure 2B:
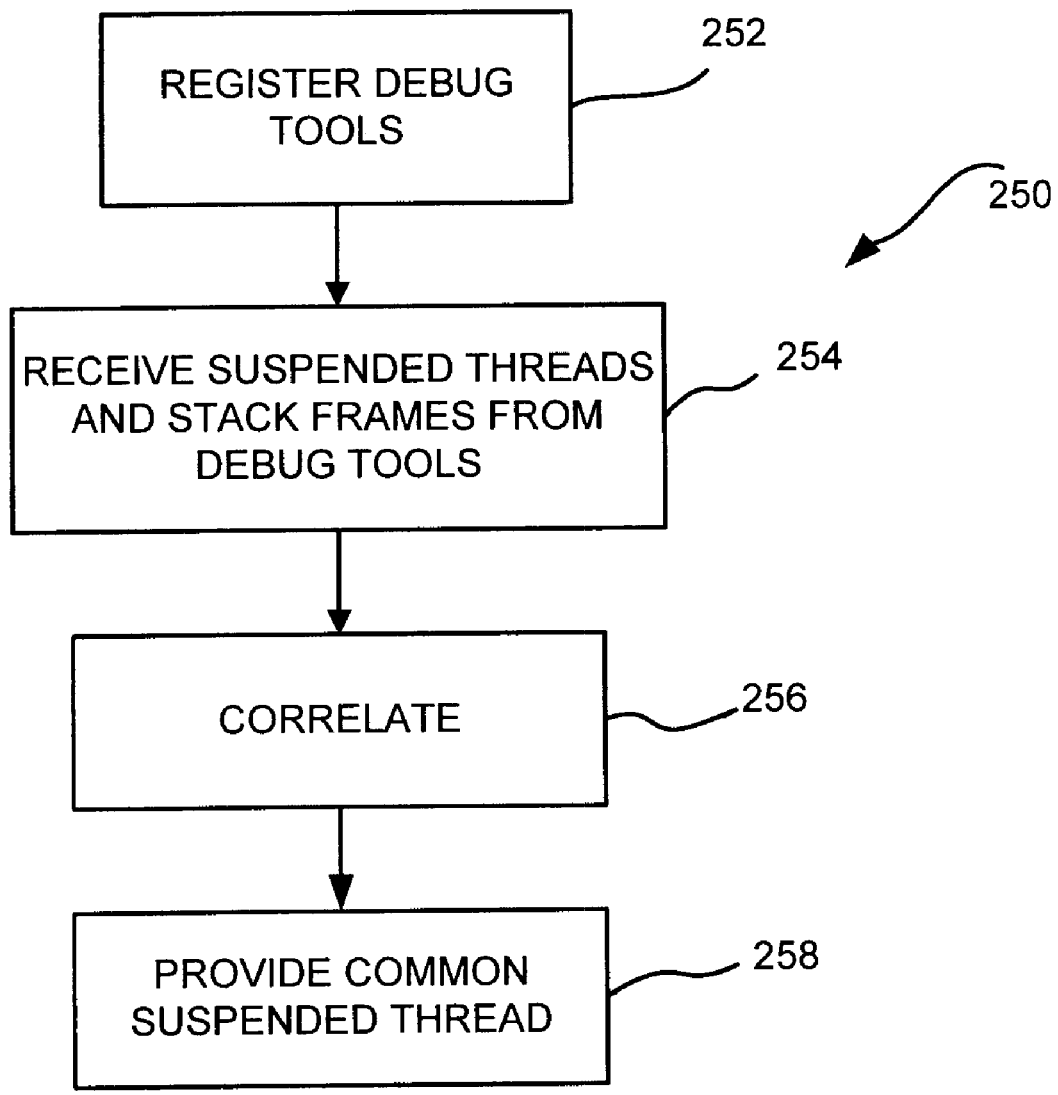
FIG. 2B illustrates an overview of common debug adaptor operational steps in flow diagram form.

Architectural and Process Overview—FIGS. 2A and 2B

Some embodiments will include one or more of the functional components/modules/mechanisms or process steps described. Any particular embodiment may not require all of the components or steps described, may use additional components or steps, or may use an entirely different organization without change the functionality, scope or spirit.

FIG. 2A provides a schematic representation of a debug environment 200, which includes a number of different language debug tools: debug tool A 204, debug tool B 206, and debug tool C 208. Each debug tool 204-208 has its own way to show suspended threads and stack frames. Further, each debug tool 204-208 need not be aware of the existence of any other tool. This arrangement is common in business integration tooling environments where multiple computer programming languages are used. FIG. 2B provides a flow chart of a process 250 used to manage these various debug tools 204-208. A suspended thread is a virtual process that is paused for debugging purposes. Stack frames are user interface representations of the calling stacks in a suspended thread. For example, if a user has added a breakpoint at a line in a Java program, when the breakpoint is hit, the user would see a suspended Java thread with several Java stack frames under it. The Java stack frames would show how the line with the breakpoint is called through the various Java classes and methods.

With reference to FIGS. 2A and 2B, the debug tools 204-208 interact with the common debug adaptor (CDA) 202 to register (step 252) the individual debug tools, through a registry module 210; receive (step 254) suspended threads and stack frames from the different debug tools 204-208 (in response to a debug event); correlate (step 256) the received suspended threads and stack frames, through a correlation module 212; and provide (step 258) a common suspended thread (i.e., merge the stack frames and provide the relevant suspended threads for use by an operator through a user interface (UI) module 214).

Debug Tools 204, 206, 208

Each debug tool 204-208 represents an external tool written to run on its own runtime (i.e., environment/software under test). Each debug tool 204-208 is identified by an identifier (pluginID). Each debug tool 204-208 can also (a) identify a server (not shown) it is debugging (EngineID); (b) identify an original instance it is running from (Global Instance ID—GIID); and (c) identify a thread (a sequence of instructions) it is running at (ThreadID).

A debug view (native to each debug tool 204-208 and not shown in the drawings) would show (a) a launcher, (b) a debug target, and (c) a thread and stack frame at which its breakpoint is suspended.

Registry Module 210

The registry module 210 registers each debug tool 204-208 to the common debug adaptor 202 by receiving pluginID type information through a receiving mechanism 216. In particular, each participating debug tool 204-208 extends the common debug adapter 202 extension point. An extension point is similar to a plug-in and adds an extra feature to a programming language or system using well established techniques in the field of the invention. Each debug tool 204-208 creates and returns a debug target, suspended threads and stack frames to the common debug adapter 202 for handling in response to one or more debug events originating from environment/software under test.

Correlation Module 212

The correlation module 212 accommodates non-Java and Java debug tools 204-208 and enables various types of stack frames to be correlated/merged. In general, the individual debug tools 204-208 routes debug events for mixed stack frame handling to the correlation module 212 of the CDA 202. A debug event is a run-time altering condition, such as a breakpoint, that is set in an application by a debugging environment user and managed by an active debugging environment that controls the running of an application. Debug events are defined by the individual debug tool 204-208.

The correlation module 212 groups the various suspended threads and stack frames from the debug tools 204-208 using a grouping mechanism 218. The grouping is determined by one or more of the EngineID, the GIID and the ThreadID described above. In one particular example, the correlation module 212: (i) creates a launcher for each EngineID; (ii) creates a debug target for each GIID; and (iii) groups debug events from the various debug tools 204-208 with the same ThreadID into stack frames under a common suspended thread.

User Interface 214

Figure 5:
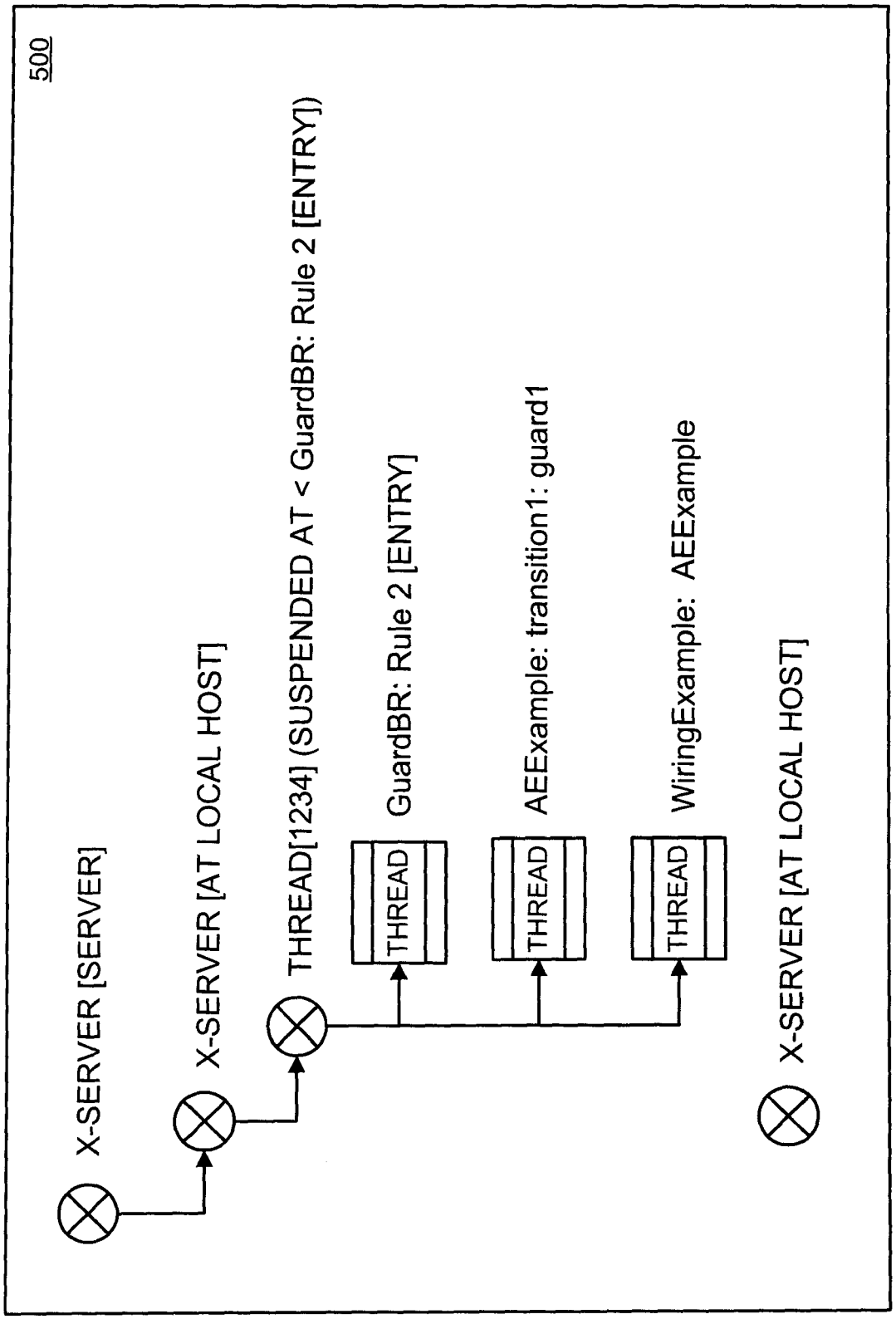
FIG. 5 illustrates an example debug view showing a common suspended thread (merged stack frames).

The UI module 214 controls the display and management of information, such as the common suspended thread, that is provided in a debug view (example provided in FIG. 5). In particular, if a user performs resume, step over, step into or step return on a target stack frame (under the common suspended frame) of the CDA 202, all these actions would be delegated to one of the debug tools 204-208. Delegation is performed by a delegating mechanism 220 and is defined as follows: (i) the CDA 202 is notified of a user action to resume/step over/step into/step return; (ii) the CDA 202 identifies the debug tool 204-208 that corresponds to the selected stack frame and (iii) calls the same action on the debug tool 204-208 identified in step (ii). The UI module 212 defines various debug view elements (such as CDADebugTarget, CDAThread, CDAStackframe) handles user interface based actions and delegates certain actions (resume, step over, step into etc.) to an individual debug tool 204-208.

Figure 3:
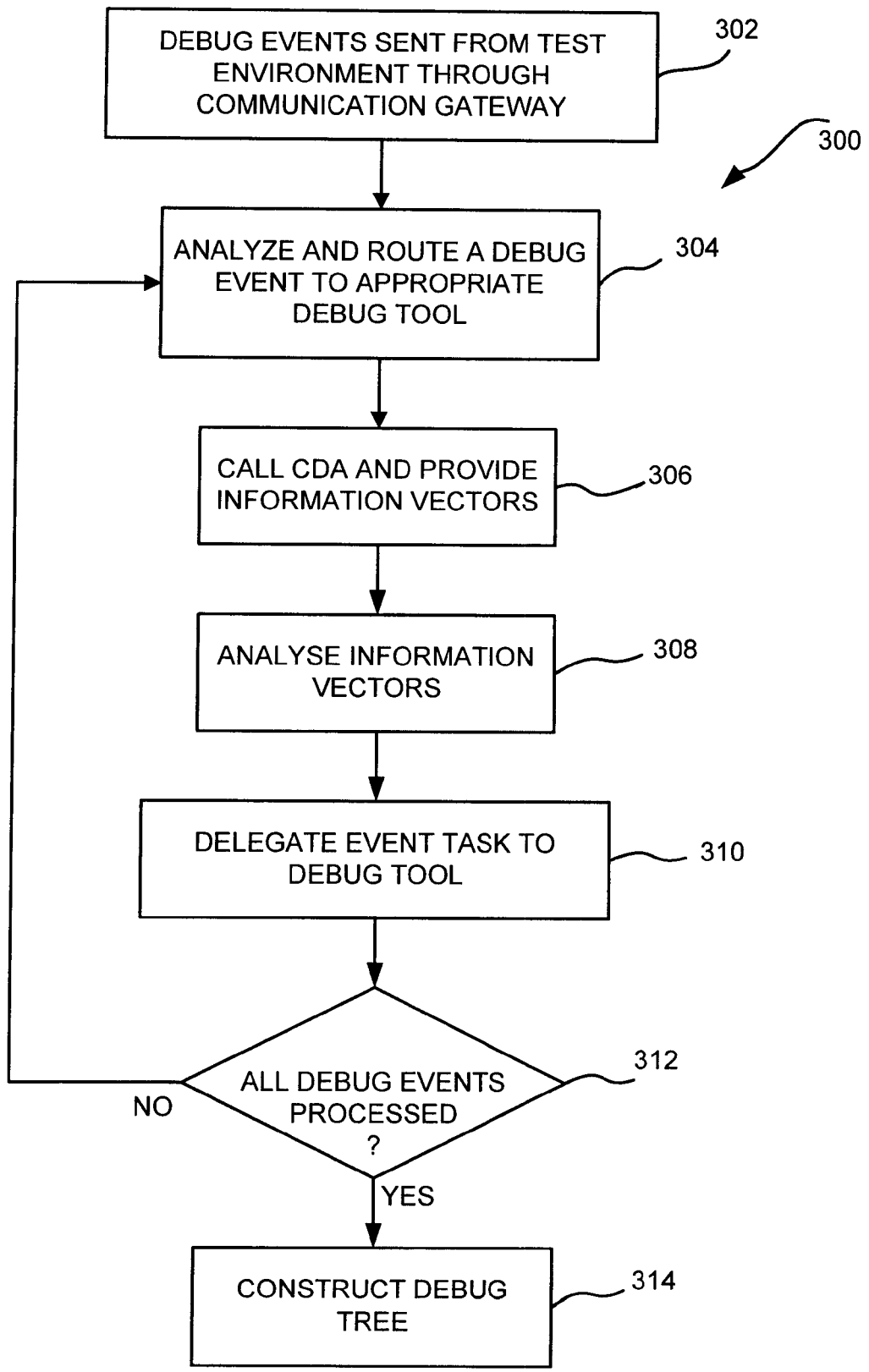
FIG. 3 illustrates further details of common debug adaptor operational steps in flow diagram form.
Figure 4:
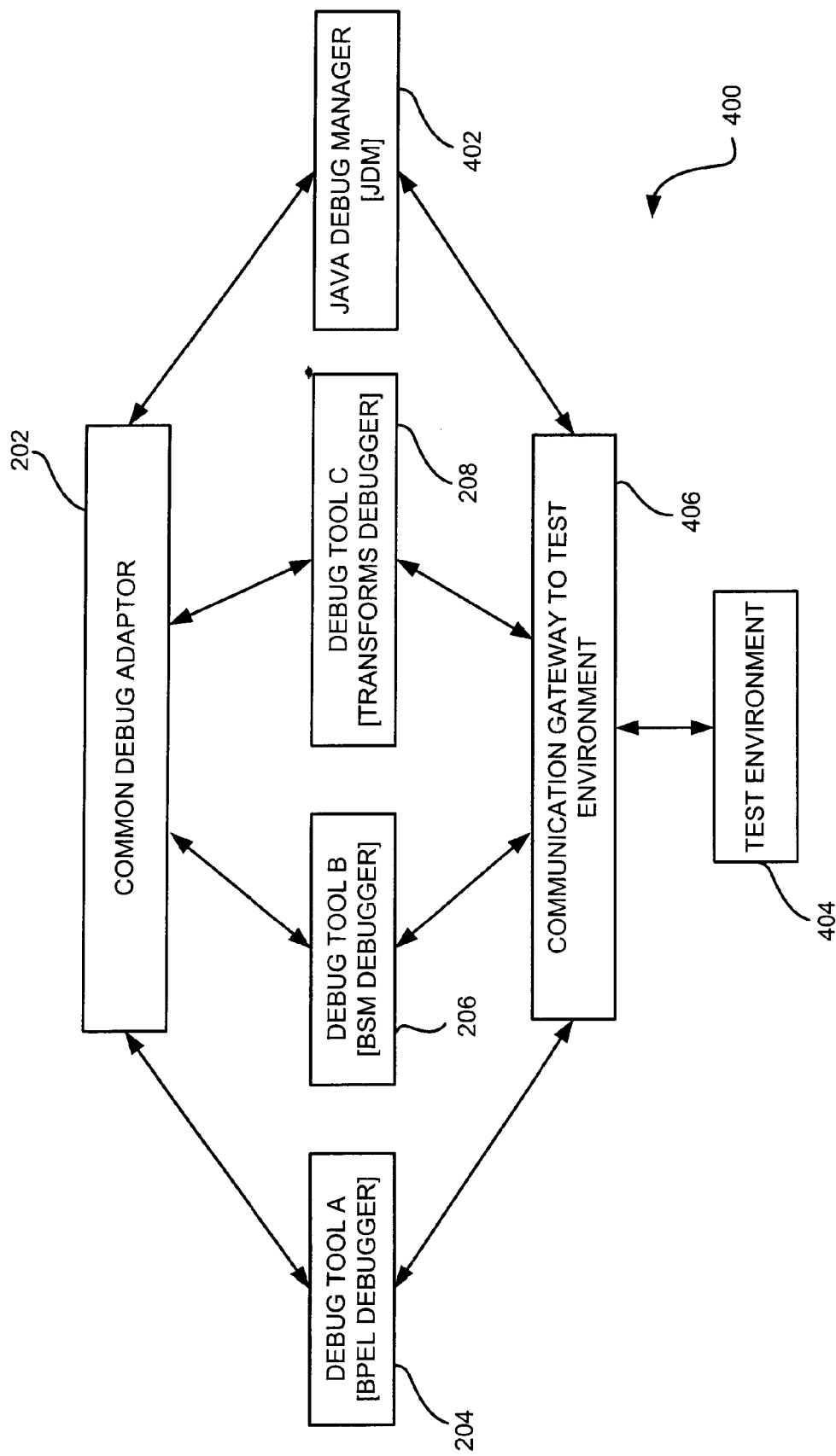
FIG. 4 illustrates a common debug adaptor architecture overview and operational example in block diagram form.

Process/System Example—FIGS. 3 and 4

A process 300 (FIG. 3) and a system 400 (FIG. 4) of managing multiple debug tools 204-208 according to various embodiments will be described in conjunction with FIGS. 3 and 4.

For the purpose of illustration in FIG. 4, the debug tools 204-208 are designated as language specific tools: tool 204 is a Business Process Execution Language (BPEL) debugger; tool 206 is a Business State Machine (BSM) debugger; and tool 208 is a transforms debugger. A Java debug manager (JDM) 402 is also illustrated. The JDM 402 acts like another debug tool to the CDA 202. The JDM 402 filters debug events, queries runtime execution for Java thread information and routes source debug information to the CDA 202 as described in more detail below.

BPEL is an XML-based language for standardizing business processes in a distributed or grid computing environment that enables separate businesses to interconnect their applications and share data. Platform-independent BPEL allows enterprises to keep internal business protocols separate from cross-enterprise protocols so that internal processes can be changed without affecting the exchange of data from enterprise to enterprise. A BPEL document, for example, keeps track of all the business processes that are connected to a transaction and ensures that the processes are executed in the correct order through the automation of messages.

The BSM and transforms debuggers 206 and 208 are examples of other debuggers that participate through the registry module 210 of the CDA 202 and are known in the art.

The JDM 402 is mainly used to filter Java debug events that would be relevant. The JDM 402 forwards a current Java debug event (JDE) to the CDA 202 and determines whether the JDE is from any of the debug tools 204-208. If so, the JDM 402 would receive correlation information on the JDE to enable delegation (as discussed above) to one of the debug tools 204 to 208 to handle the JDE and return the corresponding stack frames.

With reference to FIGS. 3 and 4, when debug events are sent 302 from a test environment 404 (such as a multi-computer program language environment) through a communication gateway 406 each debug event is analyzed and routed 304 to one of the debug tools 204-208. The analysis and routing step 304 is based on the pluginID information of the debug tool 204-208 associated with each event as described above. After routing to the appropriate debug tool (one of tools 204-208) the CDA 202 is called and provided with information vectors 306 (details of which are provided in Table A).

TABLE A

| INFORMATION VECTOR | ITEMS |
|---|---|
| (1) Instance | (a) Engine identification (Engine ID) - used as a key to keep track of its related server<br>(b) Global instance identification (GIID) - a key indicator for a debug target<br>(c) Thread identification - a key indicator for a virtual thread<br>(1a-c) can be used by the CDA 202 to merge stack frames across different servers, debug targets and threads respectively<br>(d) List of virtual threads running on a server - helps the CDA 202 and debuggers 204-208 to clear obsolete threads |

TABLE A-continued

| INFORMATION VECTOR | ITEMS |
|---|---|
| (2) Processed Stack Frame | (a) Processed debug adapters/tools<br>(b) Plugin identification of the debug adapter/tool<br>(c) Individual debug adapter identification<br>(d) Array of stack frames<br>(2a-d) contains results after the individual tools 204-208 process runtime information and create their own debug target, thread and stack frame. |
| (3) Unprocessed debug runtime event | (a) List of remaining unprocessed runtime events - contains the information from the runtime (test environment 404) that is to be processed by one of the debug tools 204-208 |

The correlation module 212 of the CDA 202 analyzes data from the information vectors 308 and delegates event tasks 310 to the debug tools 204-208 as described above. The analysis step 308 involves grouping suspended threads and stack frames into a common stack frame based on one or more of the EngineID, the GIID and the ThreadID as discussed in conjunction with the correlation module 212 of FIG. 2.

If all the debug events received (at step 302) from the test environment 404 have not been processed, as determined at step 312, then processing returns to step 304. If all the debug events received (at step 302) from the test environment 404 have been processed, as determined at step 312, processing continues to step 314 to construct a debug tree, which includes the common suspended thread.

The UI module 214 constructs the debug tree in a debug view by showing a launcher with EngineID information. The launcher includes a debug target with GIID as the identifier. The debug tree also includes various threads with the ThreadIDs and corresponding stack frames under each ThreadID (see FIG. 5 for an example).

When considering the JDM 402 (FIG. 4), the CDA 202 can also merge a Java stack frame with other stack frames (for the debug tools 204-208) given a Java breakpoint suspended in a Java thread. The test environment 404 can handle a Java match thread query to identify a suspended Java thread that originates from business integration components (i.e., part of the test environment 404). When a Java debug event arrives, from the test environment 404, the JDM 402 will try to filter the event. In particular, the JDM 402 will send a query to the test environment 404 to determine if the thread originated from one of the debug tools 204-208.

The result of the query is returned to the JDM 402 which combines the event with other debug information (e.g., information vectors) and route the information to the CDA 202 for handling. The CDA 202 would in-turn delegate any required handling back to one of the debug tools 204-208 as required. The individual debug tools 202-208 handles the Java mixed stack frame by identifying where the Java code is called from. The results from the debug tools 202-208 are rerouted to the CDA 202 for further mixed stack frame handling if required. The CDA 202 then provides the complete merged stack frame (as the common suspended stack frame) in the debug view (through the UI module 214) as previously discussed.

Debug Tree Example—FIG. 5

Assuming a server (not shown) in the test environment 404 (e.g., business integration tool) is started in a debug mode and appropriate breakpoints have been added, various breakpoints would occur. If a breakpoint occurs at a first component (in the test environment 404) which is called by a second component (in the test environment 404) a merged stack frame will be shown under the wiring thread in a debug tree 500 shown in FIG. 5. In this example, a Wiring editor calls Adaptive Entity (AE), which then calls Business Rule (BR). The merged stack frame has an inner most layer as a BR stack frame (GuardBR), then followed by an AE stack frame (AEExample) and then the Wiring stack frame (WiringExample) as an outermost layer.

The debug tree 500 illustrates that all stack frames from the debug tools (e.g., tools 204-208) have the same GIID (not illustrated but used internally) and ThreadID (e.g., 1234). If any stack frame has a different ThreadID, those stack frames would appear under another thread in the debug target. The UI module 214 can progressively disclose such that only relevant debug elements are shown in the debug tree 500. In the example of FIG. 5, the debug targets and threads for AEExample and GuardBR are hidden. The server Java threads are also hidden as they are not considered relevant to the business integration tool of this example.

In summary, embodiments of the common debug adapter 202 are generic for different debug tools 204-208 and test environments 404 (i.e., runtimes). In practical implementation, each debug tool 204-208 implements an extension point to integrate with the system 400.

The detailed description does not limit the implementation of the embodiments of the present invention to any particular computer programming language. The computer program product may be implemented in many computer programming languages provided that the OS (Operating System) provides the facilities that may support the requirements of the computer program product. An exemplary embodiment of the present invention can be implemented in the C or C++ computer programming language, or may be implemented in any other mix of supported programming languages. Any limitations presented would be a result of a particular type of operating system, computer programming language, or database management system and would not be a limitation of the embodiments of the present invention described herein.

The invention claimed is:

1. A method of debugging in a multi-computer program language environment, the method comprising:
registering, with a common debugging adaptor, a plurality of debug tools associated with
different programming languages in the multi-computer program language environment, each one of the plurality of debug tools providing suspended threads and suspended stack frames in response to a debug event in the multi-computer program language environment;
receiving the suspended threads and the suspended stack frames from the plurality of
debug tools;
correlating the received suspended threads and suspended stack frames under a common
suspended thread; and
providing the common suspended thread in a debug view;
where registering, with the common debugging adaptor, the plurality of debug tools associated with different programming languages in the multi-computer program language environment comprises receiving a debug tool identifier from each one of the plurality of debug tools.

2. The method of claim 1, where each one of the plurality of debug tools comprises the debug tool identifier, a server under debug identifier, an instance identifier, and a thread identifier.

3. The method of claim 2, where correlating the received suspended threads and suspended stack frames under the common suspended thread comprises grouping the suspended threads and the suspended stack frames from the plurality of debug tools based on at least one of the server under debug identifier, the instance identifier, and the thread identifier.

4. The method of claim 2, where correlating the received suspended threads and suspended stack frames under the common suspended thread comprises:
creating a launcher for each server under debug identifier;
creating a debug target for each instance identifier; and
grouping debug events from the plurality of debug tools having identical thread identifiers into stack frames under the common suspended thread.

5. The method of claim 2, further comprising delegating a user instruction to one of the plurality of debug tools.

6. The method of claim 5, where the user instruction comprises one of the following actions: resume, step over, step into, and step return.

7. The method of claim 6, where delegating the user instruction to one of the plurality of debug tools comprises:
receiving the user instruction;
identifying one of the plurality of debug tools that corresponds to a selected stack frame; and
calling for execution of an identical action on the identified debug tool.

8. A system for debugging in a multi-computer program language environment, comprising:
a memory; and
a processor programmed to:
register a plurality of debug tools associated with different programming languages in the multi-computer program language environment, each one of the plurality of debug tools providing suspended threads and suspended stack frames in response to a debug event in the multi-computer program language environment;
receive the suspended threads and the suspended stack frames from the plurality of debug tools;
correlate the received suspended threads and suspended stack frames under a common suspended thread; and
provide the common suspended thread in a debug view;
where, in being programmed to register the plurality of debug tools associated with different programming languages in the multi-computer program language environment, the processor is programmed to receive a debug tool identifier from each one of the plurality of debug tools.

9. The system of claim 8, where each one of the plurality of debug tools comprises the debug tool identifier, a server under debug identifier, an instance identifier, and a thread identifier.

10. The system of claim 9, where, in being programmed to correlate the received suspended threads and suspended stack frames under the common suspended thread, the processor is programmed to group the suspended threads and suspended stack frames from the plurality of debug tools based on at least one of the server under debug identifier, the instance identifier, and the thread identifier.

11. The system of claim 9, where, in being programmed to correlate the received suspended threads and suspended stack frames under the common suspended thread, the processor is programmed to:
create a launcher for each server under debug identifier;
create a debug target for each instance identifier; and
group debug events from the plurality of debug tools having identical thread identifiers into stack frames under the common suspended thread.

12. The system of claim 9, where the processor is further programmed to delegate a user instruction to one of the plurality of debug tools.

13. The system of claim 12, where the user instruction comprises one of the following actions: resume, step over, step into and step return.

14. The system of claim 13, where, in being programmed to delegate the user instruction to one of the plurality of debug tools, the processor is programmed to:
- receive the user instruction;
- identify one of the plurality of debug tools that corresponds to a selected stack frame; and
- call for execution of an identical action on the identified debug tool.

15. A computer program product for debugging in a multi-computer program language environment comprising a computer readable storage medium including computer readable program code, where the computer readable program code when executed on a computer causes the computer to:
- register a plurality of debug tools associated with different programming languages in the
- multi-computer program language environment, each one of the plurality of debug tools
- providing suspended threads and suspended stack frames in response to a debug event in the multi-computer program language environment;
- receive the suspended threads and the suspended stack frames from the plurality of debug
- tools;
- correlate the received suspended threads and suspended stack frames under a common
- suspended thread; and
- provide the common suspended thread in a debug view;
- where, in causing the computer to register the plurality of debug tools associated with
- different programming languages in the multi-computer program language environment, the computer readable program code when executed on the computer causes the computer to receive a debug tool identifier from each one of the plurality of debug tools.

16. An apparatus for debugging in a multi-computer program language environment, the apparatus comprising:
- a processor;
- a memory coupled to the processor;
- a computer program residing in the memory; and
- a common debug adaptor residing in the memory and executed by the processor;
- the common debug adaptor comprising:
- a registry module for registering a plurality of debug tools associated with different programming languages in the multi-computer program language environment, each one of the plurality of debug tools providing suspended threads and suspended stack frames in response to a debug event in the multi-computer program language environment;
- a correlation module for receiving the suspended threads and the suspended stack frames from the plurality of debug tools and correlating the received suspended threads and suspended stack frames under a common suspended thread; and
- a user interface module for providing the common suspended thread in a debug view;
- where, in registering the plurality of debug tools associated with different programming languages in the multi-computer program language environment, the registry module receives a debug tool identifier from each one of the plurality of debug tools.

* * * * *